United States Patent
Clark et al.

(10) Patent No.: US 7,464,900 B2
(45) Date of Patent: Dec. 16, 2008

(54) FOLDING RETRACTABLE PROTECTIVE DOME FOR SPACE VEHICLE EQUIPMENT

(75) Inventors: Paul R. Clark, San Diego, CA (US); Ross H. Messinger, Tustin, CA (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 10/970,472

(22) Filed: Oct. 20, 2004

(65) Prior Publication Data

US 2006/0102796 A1 May 18, 2006

(51) Int. Cl.
   *B64G 1/52*   (2006.01)
   *B63B 17/00*  (2006.01)
   *E04F 10/02*  (2006.01)
   *E06B 3/48*   (2006.01)

(52) U.S. Cl. ............... 244/171.7; 244/121; 244/159.5; 244/129.4; 160/56; 160/132; 114/361; 89/36.01; 52/5

(58) Field of Classification Search ............ 244/121, 244/129.4, 171.7; 280/644, 647, 32.5, 47.38; 411/211, 361; 105/377.01, 377.04, 377.05; 52/2.19, 66, 3, 5; 296/136.12; 135/124–126; 160/54, 56, 114, 132, 352; 89/36.11, 36.12; 343/705, 708

See application file for complete search history.

(56) References Cited

U.S. PATENT DOCUMENTS

| | | | | |
|---|---|---|---|---|
| 841,719 A * | 1/1907 | Ross | .................. | 114/361 |
| 1,126,236 A * | 1/1915 | Lees | .................. | 5/416 |
| 1,143,774 A * | 6/1915 | Nicholls | .................. | 135/88.02 |
| 1,327,339 A * | 1/1920 | Logan | .................. | 244/121 |
| 1,806,366 A * | 5/1931 | Pivak | .................. | 244/121 |
| 2,508,398 A * | 5/1950 | Kelch, Jr. | .................. | 280/644 |
| 2,571,362 A * | 10/1951 | Hervey | .................. | 135/134 |
| 3,149,703 A * | 9/1964 | De Felice | .................. | 52/52 |
| 3,190,300 A * | 6/1965 | Wear | .................. | 135/126 |
| 3,313,112 A * | 4/1967 | Reichert et al. | .................. | 60/200.1 |
| 3,432,125 A * | 3/1969 | Schroeder, Jr. | .................. | 244/130 |
| 3,478,986 A * | 11/1969 | Fogarty | .................. | 244/159.4 |
| 4,402,544 A * | 9/1983 | Artim et al. | .................. | 296/110 |
| 4,425,929 A * | 1/1984 | Von Mosshaim | .................. | 135/132 |
| 4,669,685 A * | 6/1987 | Dalby | .................. | 244/171.7 |
| 4,699,195 A * | 10/1987 | Lester | .................. | 160/134 |
| 4,832,288 A * | 5/1989 | Kendall et al. | .................. | 244/159.2 |

(Continued)

*Primary Examiner*—Michael R. Mansen
*Assistant Examiner*—Joshua J Michener
(74) *Attorney, Agent, or Firm*—MacPherson Kwok Chen & Heid LLP

(57) ABSTRACT

A folding, retractable dome for protecting a feature, such as a docking mechanism, a hatch or other equipment at an exterior surface of a space vehicle, includes a plurality of arcuate ribs, each having opposite ends respectively pinioned at opposite sides of the feature at the surface of the vehicle for rotational movement about an axis of rotation extending through the opposite ends and through an arcuate path of revolution extending over the feature, and a flexible cover attached to each of the ribs such that, in a deployed configuration of the dome, in which adjacent ribs are rotated apart from each other at a maximum relative angle therebetween, the cover is stretched generally tangentially between the adjacent ribs to form a generally arcuate shield over the feature, and in a retracted position of the dome, in which adjacent ribs are rotated together at a minimum relative angle therebetween, the cover is collapsed to define folded pleats between the adjacent ribs.

24 Claims, 5 Drawing Sheets

U.S. PATENT DOCUMENTS

| | | | |
|---|---|---|---|
| 4,833,837 A * | 5/1989 | Bonneau | 52/2.19 |
| 4,869,446 A * | 9/1989 | Hubert et al. | 244/121 |
| 4,941,680 A * | 7/1990 | Baiker | 280/793 |
| 5,010,939 A * | 4/1991 | King | 160/84.07 |
| 5,044,579 A * | 9/1991 | Bernasconi et al. | 244/158.3 |
| 5,070,659 A * | 12/1991 | Brisbin et al. | 52/6 |
| 5,080,306 A * | 1/1992 | Porter et al. | 244/171.7 |
| 5,168,912 A * | 12/1992 | Jelic et al. | 160/84.07 |
| 5,328,132 A * | 7/1994 | Shelby, Jr. | 244/53 R |
| 5,436,630 A * | 7/1995 | Nash | 342/2 |
| 5,601,258 A * | 2/1997 | McClymonds | 244/171.7 |
| 5,609,315 A * | 3/1997 | Lepore, Jr. | 244/171.7 |
| 5,625,982 A * | 5/1997 | Foote | 52/64 |
| 5,716,030 A * | 2/1998 | LaFiandra et al. | 244/158.1 |
| 5,746,237 A * | 5/1998 | Arnic | 135/88.06 |
| 6,029,733 A * | 2/2000 | Xue | 160/84.07 |
| 6,065,252 A * | 5/2000 | Norsen | 52/66 |
| 6,092,856 A * | 7/2000 | Ladensack | 296/100.11 |
| 6,231,010 B1 * | 5/2001 | Schneider et al. | 244/158.3 |
| 6,273,115 B1 * | 8/2001 | Guggisberg | 135/135 |
| 6,431,393 B1 * | 8/2002 | Stewart | 220/826 |
| 6,547,189 B1 * | 4/2003 | Raboin et al. | 244/158.3 |
| 6,729,076 B1 * | 5/2004 | Gale | 52/74 |
| 6,974,109 B1 * | 12/2005 | Mezits et al. | 244/158.3 |
| 7,013,904 B2 * | 3/2006 | Kofler | 135/132 |
| 7,051,481 B2 * | 5/2006 | Delavega et al. | 52/66 |
| 7,093,799 B1 * | 8/2006 | Dulat et al. | 244/121 |
| 2004/0207566 A1 * | 10/2004 | Essig et al. | 343/878 |
| 2005/0284986 A1 * | 12/2005 | Bigelow | 244/171.7 |
| 2006/0033674 A1 * | 2/2006 | Essig et al. | 343/912 |
| 2006/0102796 A1 * | 5/2006 | Clark et al. | 244/171.7 |

* cited by examiner

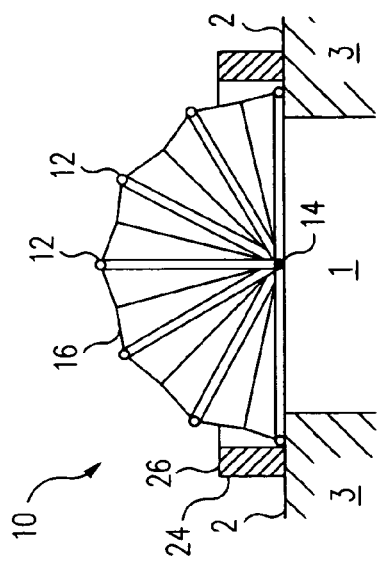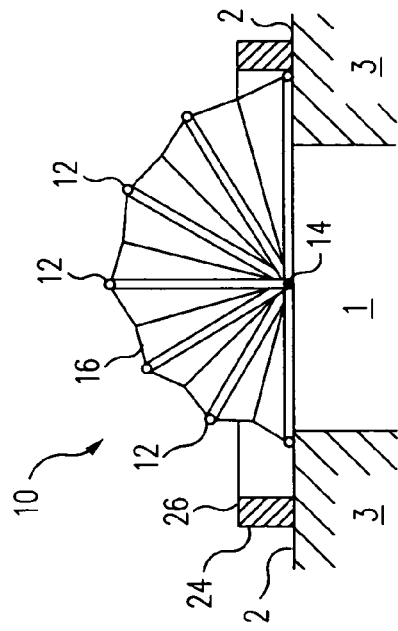
FIG. 1A
FIG. 1B
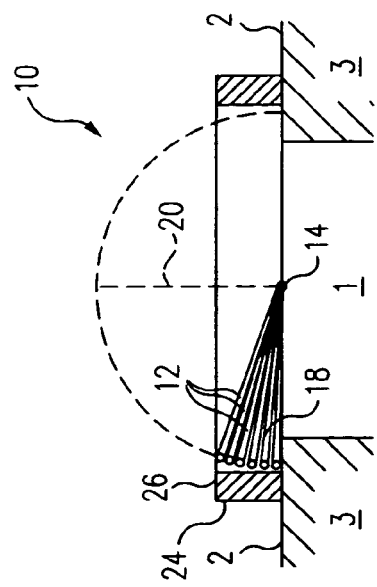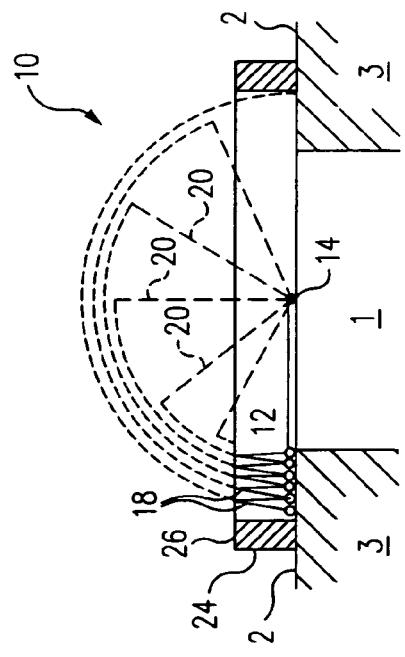
FIG. 2A
FIG. 2B

FOLDING RETRACTABLE PROTECTIVE DOME FOR SPACE VEHICLE EQUIPMENT

STATEMENT REGARDING FEDERALLY SPONSORED RESEARCH OR DEVELOPMENT

The invention described herein was made in the performance of work under NASA Contract No. NAS8-01099 and is subject to the provisions of Section 305 of the National Aeronautics and Space Act of 1958 (72 Stat.435: 42 U.S.C. 2457).

RELATED APPLICATIONS

This application is related to U.S. application Ser. No. 10/969,829, filed concurrently herewith, which is incorporated herein by reference in its entirety.

TECHNICAL FIELD

This invention relates to protective shields for space vehicles in general, and in particular, to folding, retractable domes for providing thermal and micrometeoroid and orbital debris ("MMOD") protection for docking mechanisms, hatches, and other equipment disposed on an exterior surface of a space vehicle, space station, space exploration habitat, and the like.

BACKGROUND

The environment of space is relatively harsh and can subject the equipment used on the exterior of space vehicles, space stations, and space exploration habitats, such as hatches, docking mechanisms, antennae, cameras, sensors and the like, to a wide variety of potentially harmful agents, including strong thermal radiation and micrometeoroid impacts. Consequently, it is frequently desirable to provide a protective shield over the affected equipment to ameliorate the damaging effects of such elements. Conventional space vehicle protective doors and shields are typically generally planar in shape and cantilevered to one side of the area of the affected equipment when disposed in an open position, and can therefore interfere with the openings that they close, or the equipment on the surface of the vehicle that they are intended to protect, such as a docking ring or an antenna.

Consequently, a long-felt but as yet unsatisfied need exists for a simple, reliable protective cover that can be deployed over a docking mechanism, hatch, or other equipment used on the surface of a space vehicle to provide at least thermal and MMOD protection for the equipment that overcomes the disadvantages of conventional doors and shields as discussed above.

BRIEF SUMMARY

In accordance with exemplary embodiments of the present invention, a simple, reliable, foldingly retractable protective dome is provided that can be deployed over a docking mechanism, hatch, or other equipment used on the surface of a space vehicle to provide at least thermal and MMOD protection for the equipment, and that is capable of being retracted completely out of the way of the protected equipment when not in use, that overcomes the disadvantages of conventional doors and shields as discussed above.

In accordance with an exemplary embodiment thereof, the novel protective dome comprises a plurality of arcuate ribs, each having opposite ends respectively pinioned at the surface of the vehicle on opposite sides of the feature to be protected for rotational movement about an axis of rotation extending through the opposite ends and through an arcuate path of revolution extending over the feature. A continuous, flexible cover is attached to each of the ribs in such a way that, in a deployed position of the dome, in which adjacent ribs are rotated apart from each other at a maximum relative angle therebetween, the cover is stretched generally tangentially between the adjacent ribs to form an arcuate shield over the feature, and in a retracted position of the dome, in which adjacent ribs are rotated together at a minimum relative angle therebetween, the cover is collapsed to form folded pleats between the adjacent ribs. Advantageously, the flexible cover may comprise at least one of a thermal protection blanket and a micrometeoroid- and debris-resistant barrier for shielding of the protected feature.

In one exemplary embodiment, the arcuate ribs are semicircular in shape, and may have respective radii that are substantially the same size, or alternatively, at least one of the ribs may have a radius that is larger than the respective radii of the other ribs. In another alternative embodiment, the ribs may advantageously have respective radii that are staggered in size, such that the ribs "nest" radially, i.e., are disposed in radial alignment with each other when rotated to a common angle relative to the surface of the vehicle, e.g., when the ribs are rotated to the fully retracted position.

In a "bi-fold" embodiment of the dome, the flexible cover of the first embodiment may comprise two parts, each defining a portion of an arcuate protective dome, that mate with each other at, e.g., a vertical plane extending through the feature when the dome is deployed. In such an embodiment, the dome may include an even number of ribs, half of which are disposed on one side of the feature, and the other half of which are disposed on an opposite side thereof.

Advantageously, the first embodiment may also include a protective annular bezel having an internal radius that is larger than the radius of any of the ribs of the dome, which is disposed on the surface of the vehicle and aligned generally concentrically with the protected feature. The ribs and the pleated cover can be arranged to reside below an upper periphery of the bezel when the dome is fully retracted.

A better understanding of the above and many other features and advantages of the embodiments of the present invention may be obtained from a consideration of the detailed description thereof below, particularly if such consideration is made in conjunction with the appended drawings, in which like reference numerals are used to identify like elements illustrated in one or more of the figures.

BRIEF DESCRIPTION OF THE DRAWINGS

FIG. 1A is a partial cross-sectional elevation view of a folding, flexible protective dome in accordance with an exemplary embodiment of the present invention, shown in a retracted position over a feature on the surface of a space vehicle;

FIG. 1B is a partial cross-sectional elevation view of the protective dome of FIG. 1A, shown in a deployed position over the feature;

FIG. 2A is a partial cross-sectional elevation view of a folding, flexible protective dome in accordance with another exemplary embodiment of the present invention, shown in a retracted position over a feature on the surface of a space vehicle;

FIG. 2B is a partial cross-sectional elevation view of the protective dome of FIG. 2A, shown in a deployed position over the feature;

Embodiments of the present invention and their advantages are best understood by referring to the detailed description that follows. It should be appreciated that like reference numerals are used to identify like elements illustrated in one or more of the figures.

DETAILED DESCRIPTION

Figure 3A:
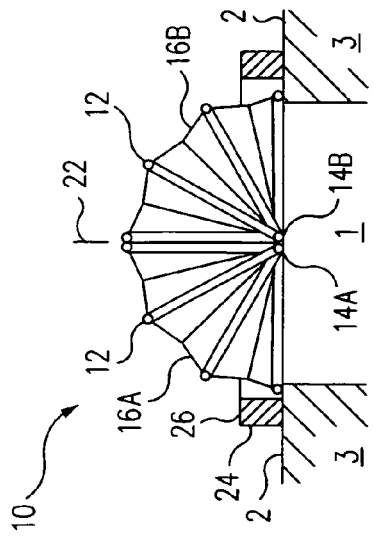
FIG. 3A is a partial cross-sectional elevation view of a folding, flexible protective dome in accordance with another exemplary embodiment of the present invention, shown in a retracted position over a feature on the surface of a space vehicle.

Four alternative embodiments of a folding, flexible protective dome 10 in accordance with the present invention are shown in the partial cross-sectional elevation views of FIGS. 1A, 2A, 3A and 4A, in which the respective exemplary folding domes are shown disposed in a fully retracted, or open, position over a feature 1 on the surface 2 of a space vehicle 3. In the particular embodiments illustrated, the feature to be protected comprises an opening 1 in the surface of the vehicle, e.g., for a hatch or a docking mechanism (not illustrated), but it should be understood that the protective domes of the present invention are also capable of shielding other types of equipment as well, either upstanding from the surface of the vehicle or flush-mounted thereon, e.g., a telescope or a window. Additionally, if appropriately configured, the protective domes can also function as doors or closures, depending on the particular application at hand.

FIGS. 1B, 2B, 3B and 4B are partial cross-sectional elevation views of the folding; flexible protective domes 10 of FIGS. 1A, 2A, 3A and 4A, respectively, showing the domes fully deployed, i.e., shut or closed, over the feature 1 to shield it. As illustrated in the figures, the respective alternative dome embodiments incorporate several common elements, including a plurality of arcuate ribs 12, each having opposite ends respectively pinioned at opposite sides of the feature at about the surface 2 of the vehicle 3 for rotational movement of the rib about an axis of rotation 14 (seen end-on in the figures) extending through the opposite ends thereof, and through an arcuate path of revolution extending over the feature, as indicated by the arcuate dashed lines therein. In the particular flexible dome embodiments illustrated in the figures, the arcuate ribs 12 are shown as generally semicircular in planform shape, thereby resulting in protective domes 10 that are generally hemispherical in shape when deployed, and hence, exhibiting a minimum surface area of dome for a given volume enclosed thereby. However, as will be appreciated by those of skill in the art, other generally arcuate rib shapes are possible for the protective domes of the present invention, e.g., polygonal, depending on the particular application at hand.

In accordance with the several exemplary embodiments of the invention, the folding protective domes 10 each further comprises a continuous, flexible cover 16 that is attached to each of the ribs 12 in such a way that, in the closed, or fully deployed position of the dome, as respectively illustrated in FIGS. 1B, 2B, 3B and 4B, in which adjacent ones of the ribs are rotated apart from each other at a maximum relative angle therebetween, the cover 16 is stretched generally tangentially between the adjacent ribs to form a generally hemispherical shield over the feature, and in the open, or fully retracted position of the dome, as respectively illustrated FIGS. 1A, 2A, 3A and 4A, in which adjacent ribs are rotated together at a minimum relative angle therebetween, the cover is collapsed to form either radial or circumferential folded pleats 18 between the adjacent ribs, as described in more detail below.

In the protective dome 10 embodiment illustrated in FIGS. 1A and 1B, the semicircular ribs 12 have respective radii 20 that are substantially the same size, such that, in the retracted position of the dome, as illustrated in FIG. 1A, the ribs are circumferentially "stacked" adjacent to each other, with a relatively small relative rotational angle between adjacent ribs, and with the pleats 18 of the flexible cover 16 extending radially inward toward the axis of rotation 14 of the ribs. It is also possible, of course, to arrange the pleats of the cover such that they extend radially outward, or in yet another embodiment, in alternating radial directions.

Figure 3B:
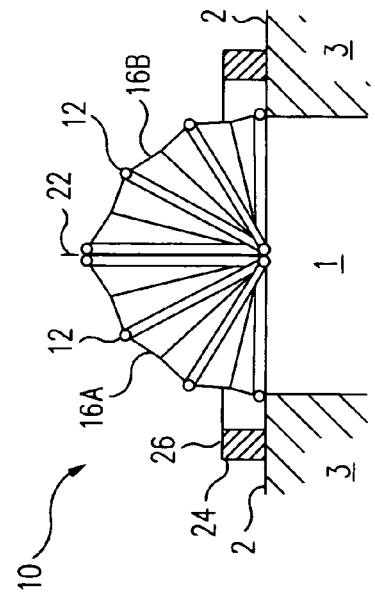
FIG. 3B is a partial cross-sectional elevation view of the protective dome of FIG. 3A, shown in a deployed position over the feature.

A similar embodiment of the folding dome 10 is illustrated in FIGS. 3A and 3B, except that in this "bi-fold" embodiment, the flexible cover 16 comprises two parts, each defining a portion, e.g., a half, of the generally hemispherical shield formed over the protected feature 1 when the dome is deployed, as illustrated in FIG. 3B. The semicircular ribs 12 of this embodiment, in addition to having respective radii 20 that are substantially the same in size, are also even in number, with half of the ribs being disposed on one side of the feature 1, and the other half being disposed on an opposite side thereof, such that during deployment of the dome, the two portions of the cover 16 mate with each other at a sagital, or vertical plane 22 extending through the feature, as illustrated in FIG. 3B. To facilitate such a mating of the two portions, it may be desirable to pinion the respective ribs 12 in each of the two aliquot sets of ribs about two parallel, adjacent axes of rotation 14A and 14B, as illustrated. As may be seen by a comparison of FIGS. 1A and 3A, the bi-fold embodiment of the dome of FIG. 3A can result in a reduced height of the dome above the surface 2 when it is retracted. when compared to that of the "single-fold" dome of FIG. 1A.

In the flexible dome 10 embodiment illustrated in FIGS. 2A and 2B, the ribs 12 have respective radii 20 that are staggered in size, such that the ribs "nest" radially within each other, i.e., are in radial alignment with each other, when rotated to a common angle relative to the surface 2 of the vehicle 3, e.g., when the ribs are rotated to the fully retracted position, as illustrated in FIG. 2A. As may be seen in this figure, the pleats 18 of the flexible cover 16 of the dome extend in the circumferential direction when folded. It may be noted that, in this embodiment, the contour of the dome when deployed is similar to that of a portion of the spiral shell of a nautilus, rather than being strictly hemispherical, as in the protective domes 10 of FIGS. 1B and 3B described above, due to the staggered radii sizes of the ribs.

Figure 4A:
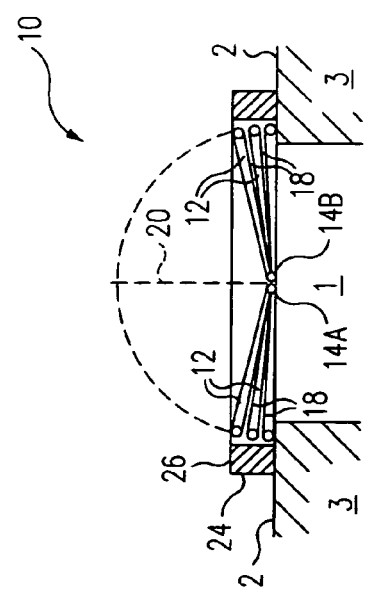
FIG. 4A is a partial cross-sectional elevation view of a folding, flexible protective dome in accordance with another exemplary embodiment of the present invention, shown in a retracted position over a feature on the surface of a space vehicle.
Figure 4B:
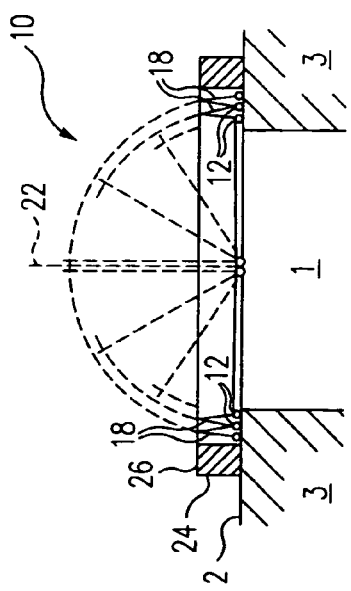
FIG. 4B is a partial cross-sectional elevation view of the protective dome of FIG. 4A, shown in a deployed position over the feature.

As in the case of the "equi-radial" flexible domes of FIGS. 1A and 3A above, it is possible to confect a bi-folding protective dome 10 having nesting ribs 12, as illustrated in FIGS. 4A and 4B. As in the equi-radial bi-fold embodiment above, the flexible cover 16 comprises two parts, each defining a portion, e.g., a half, of the generally hemispherical shield formed over the feature when the dome is deployed, as illustrated in FIG. 4B.

The ribs 12 of this embodiment, in addition to having respective radii 20 that are staggered in size, are also even in number, with half of the ribs being disposed on one side of the feature 1, and the other half being disposed on an opposite side thereof, such that during full deployment of the dome 10, the two portions of the cover 16 mate with each other at a vertical plane 22 extending through the feature, as illustrated in FIG. 4B. As in the equi-radial bi-fold embodiment of FIGS. 3A and 3B above, it may be desirable to pinion the opposite ends of the respective ribs 12 in each of the two sets about two separate, parallel, adjacent axes of rotation 14A and 14B, as illustrated, to facilitate the mating of the two parts of the dome at the vertical plane 22 when deployed. Alternatively, the outermost rib of one set of the ribs can be made slightly larger than the outermost rib of the other set of ribs, such that the two portions of the dome slightly overlap circumferentially when the dome is deployed. Also, as may be seen by a comparison of FIGS. 2A and 4A, the bi-fold embodiment of the dome of FIG. 4A can result in a substantially reduced diameter of dome when in the fully retracted position than the single-fold protective dome of FIG. 2A.

Figure 5A:
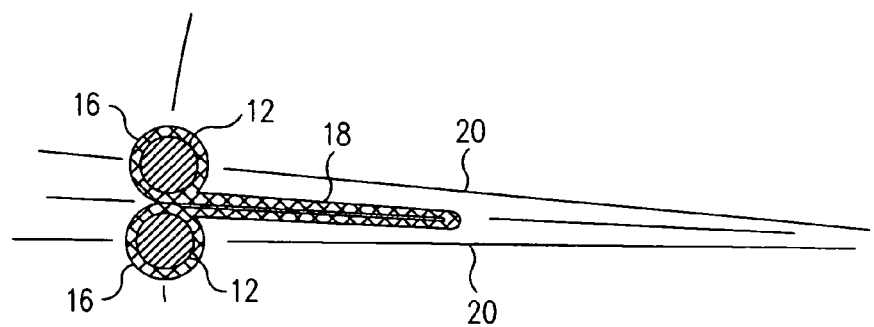
FIG. 5A is a partial cross-sectional view of two adjacent ribs and a portion of a flexible cover of an exemplary embodiment of a protective dome of the present invention, showing the ribs rotated together at a minimum relative angle therebetween, and the cover collapsed to form a folded radial pleat between the ribs.
Figure 5B:
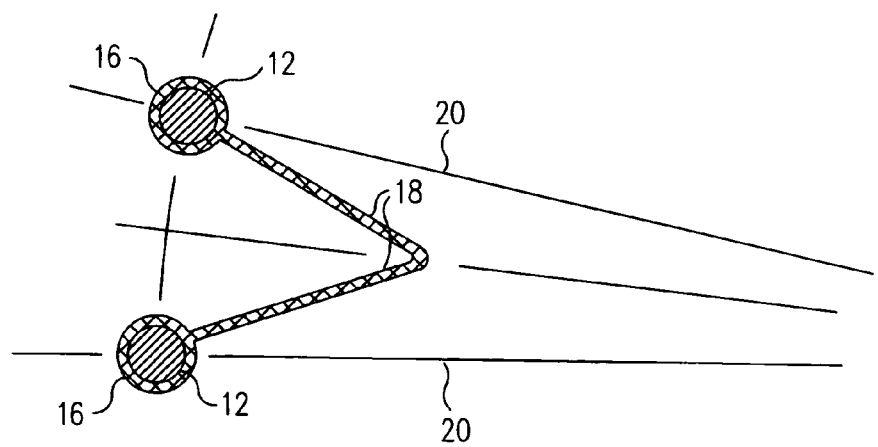
FIG. 5B is a partial cross-sectional view of the ribs and cover of FIG. 5A, showing the ribs rotated apart from each other at an intermediate relative angle therebetween, and the radial pleat in the cover between the ribs partially unfolded.
Figure 5C:
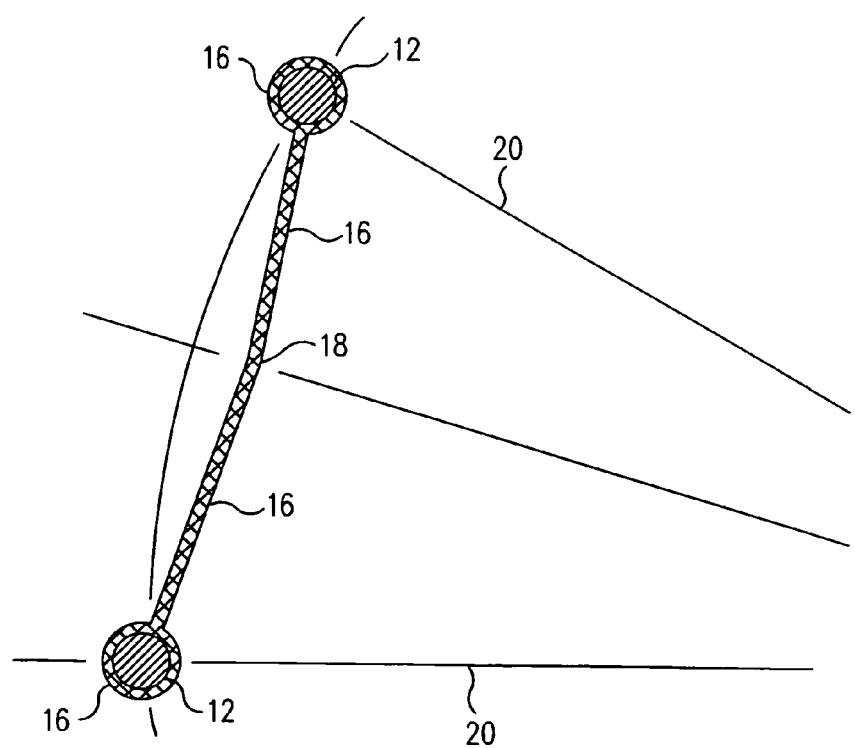
FIG. 5C is a partial cross-sectional view of the ribs and cover of FIG. 5B, showing the ribs rotated apart from each other at a maximum relative angle therebetween, and the radial pleat in the cover between the ribs fully unfolded such that the cover is stretched generally tangentially between the ribs.

The unfolding of a radial pleat 18 of the flexible cover 16 of a flexible dome 10 having ribs 12 of the same size, such as those illustrated in FIGS. 1A and 3A, is illustrated sequentially in FIGS. 5A-5C. In the partial cross-sectional view of FIG. 5A, two adjacent ribs 12 of the dome are shown in the retracted position of the dome, in which the two ribs are rotated together circumferentially at a minimum possible relative angle therebetween, such that the cover 16 is collapsed between the two ribs to form at least one folded, radially extending pleat 18. In FIG. 5B, the two ribs are shown rotated apart from each other at an intermediate relative angle therebetween, such that the radial pleat 18 in the cover 16 is partially unfolded. In FIG. 5C, the two adjacent ribs 12 are shown rotated apart from each other at a maximum relative angle therebetween, i.e., fully deployed, with the radial pleat in the cover between the ribs being fully unfolded such that the cover 16 is stretched to extend generally tangentially between the two ribs.

Figure 6A:
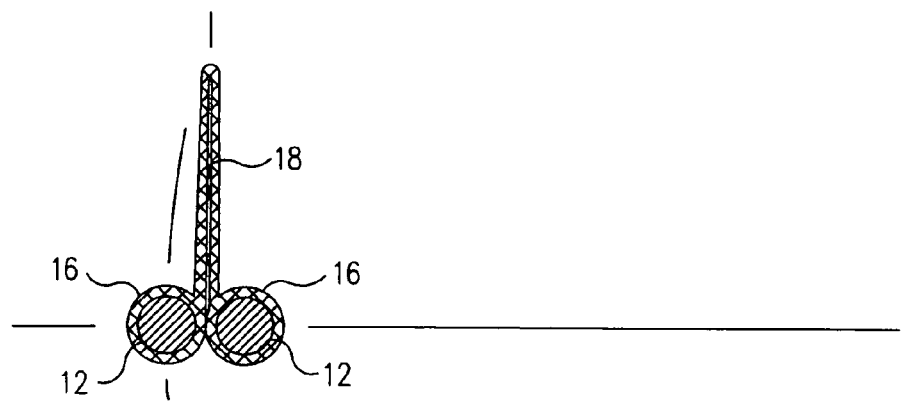
FIG. 6A is a partial cross-sectional view of two adjacent ribs and a portion of a flexible cover of another exemplary embodiment of a protective dome of the present invention, showing the ribs rotated together at a minimum relative angle therebetween, and the cover collapsed to form a folded circumferential pleat between the ribs.
Figure 6B:
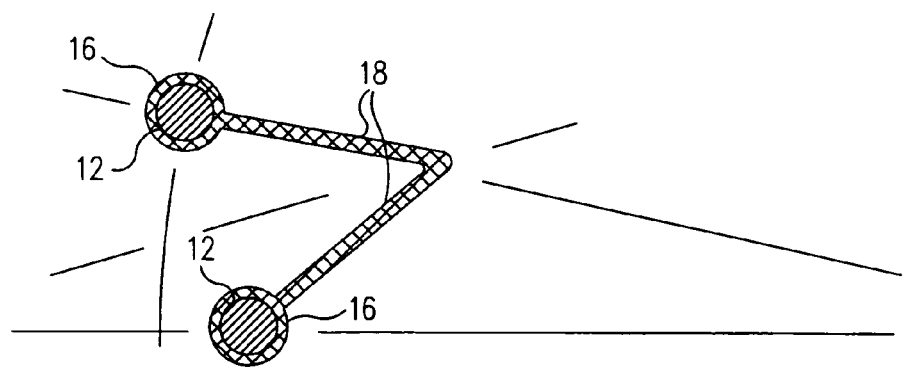
FIG. 6B is a partial cross-sectional view of the ribs and cover of FIG. 6A, showing the ribs rotated apart at an intermediate relative angle therebetween, and the circumferential pleat in the cover between the ribs partially unfolded.
Figure 6C:
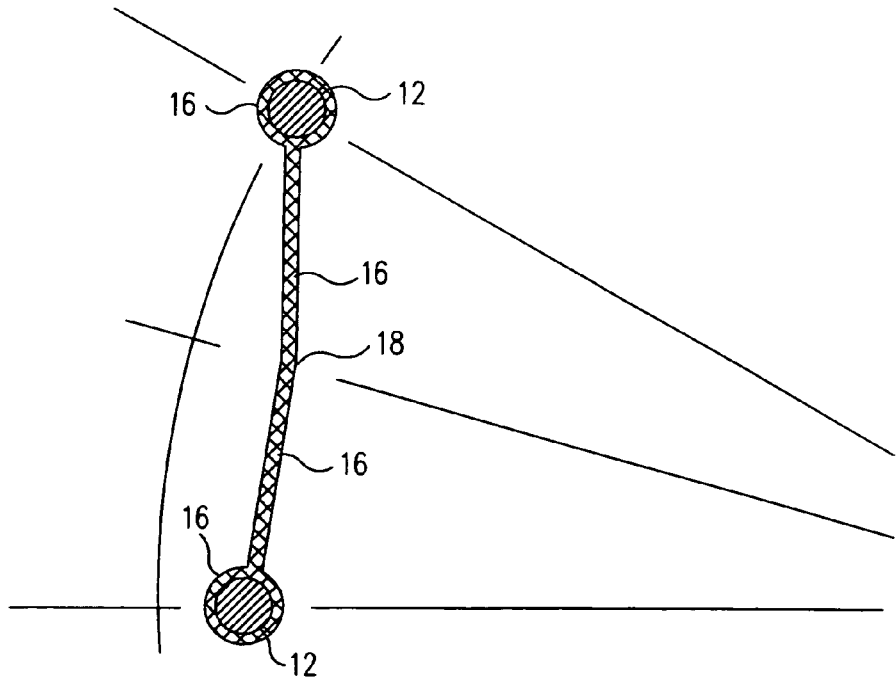
FIG. 6C is a partial cross-sectional view of the ribs and cover of FIG. 6B, showing the ribs rotated apart from each other at a maximum relative angle therebetween, and the circumferential pleat in the cover between the ribs fully unfolded such that the cover is stretched generally tangentially between the ribs.

The unfolding of a pleat 18 of the flexible cover 16 of a flexible dome 10 having ribs 12 with staggered-sized, nesting radii 20, such as those illustrated in FIGS. 2A and 4A, is illustrated sequentially in FIGS. 6A-6C. In the partial cross-sectional view of FIG. 6A, two adjacent ribs 12 of the dome are shown in the retracted position, in which the two ribs are rotated together at a minimum possible relative angle therebetween, i.e., such that they are generally coplanar, and the cover 16 is shown collapsed between the two ribs to form at least one folded, circumferentially extending pleat 18. In FIG. 6B, the two ribs are shown rotated apart from each other at an intermediate relative angle therebetween, such that the circumferential pleat 18 in the cover 16 is thereby partially unfolded. In FIG. 5C, the two adjacent ribs 12 are shown rotated apart from each other at a maximum relative angle therebetween, i.e., fully deployed, with the circumferential pleat in the cover between the ribs being fully unfolded, such that the cover 16 is stretched generally tangentially between the ribs.

The flexible cover 16 of the above exemplary embodiments of protective domes 10 may be confected of a wide variety of materials, e.g., a resilient elastomer, such as polyurethane, which optionally may be reinforced with a metal, glass or carbon-fiber cloth or mesh. Advantageously, the cover may be coated with or confected to incorporate at least one of a thermal protection blanket and a micrometeoroid- and debris-resistant barrier for shielding purposes. Additionally, in the particular embodiments illustrated, the flexible cover is shown attached to each of the ribs 12, which are shown to incorporate a circular cross-section, with a loose, annular sleeve about the rib, so that the ribs rotate freely relative to the cover without binding during deployment and retraction. However, many other forms of rib cross-sectional shapes and cover attachments are possible. For example, the ribs can comprise flattened, elongated bands, and the cover can incorporate a plurality of small, alternating, accordion-type pleats between adjacent ribs. Similarly, the ribs 12 need not necessarily be semicircular in shape, but may have other shapes as well, e.g., polygonal, to accommodate features 1 of different shapes. However, it should be understood that the resulting shape of the dome, when deployed, will generally not be hemispherical, and accordingly, that the ratio of the surface area of the resulting dome to the volume enclosed by it will not be minimized.

As illustrated in FIGS. 1A-4B, the flexible protective domes 10 of the present invention may further advantageously comprise a protective annular bezel 24. The bezel may include an internal radius larger than the radius of any of the fibs of the dome 10, be disposed on the surface 2 of the vehicle 3, and be aligned generally concentrically with the feature 1 protected by the dome. The height of the bezel can be selected such the ribs 12 all reside below an upper periphery 26 of the bezel when the dome is fully retracted, and the bezel thus functions to protect the components of the retracted dome from traffic on the surface of the vehicle in the vicinity of the feature.

Figure 7A:
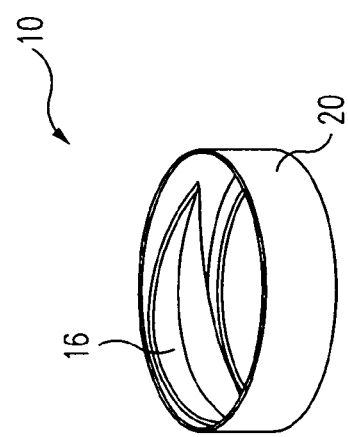
FIGS. 7A-7C are perspective views of the protective dome of FIGS. 1A and 1B in closed, partially closed, and open views, respectively; and, FIGS. 8A-8C are perspective views of the protective dome of FIGS. 3A and 3B in closed, partially closed, and open views, respectively.
Figure 7B:
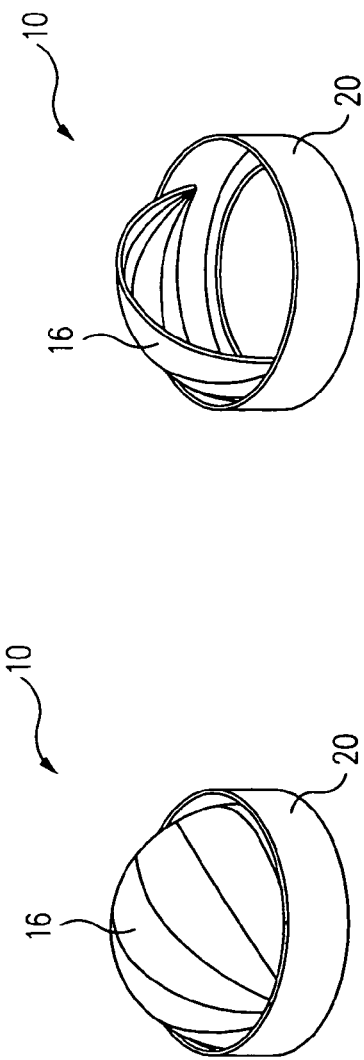
Figure 7C:
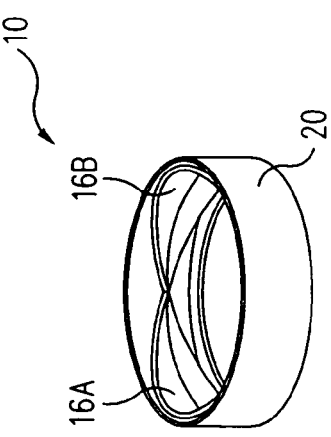
Figure 8A:
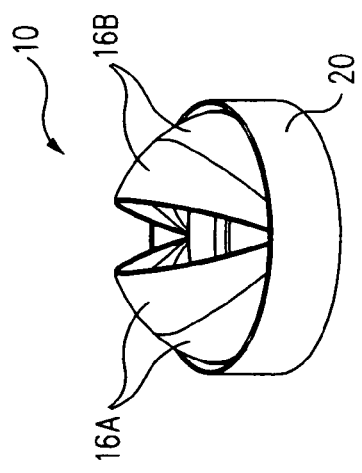
Figure 8B:
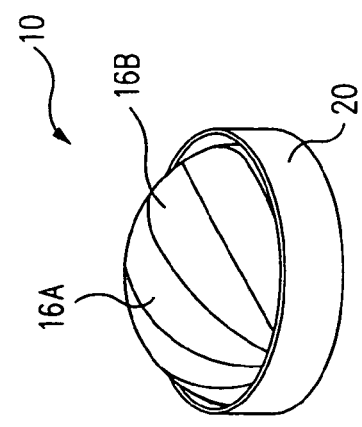
Figure 8C:
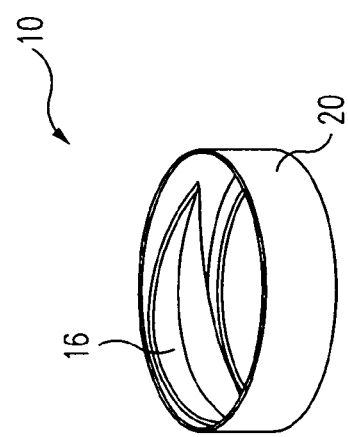

In FIGS. 7A-7C, the protective domes of FIGS. 1A and 1B are shown in the closed (i.e., shut or deployed), partially closed, and open (i.e., retracted) positions, respectively. In FIGS. 8A-8C, the protective dome of FIGS. 3A and 3B are shown in the closed, partially closed, and open positions, respectively.

By now, those of skill in this art will appreciate that many modifications, substitutions and variations can be made in and to the materials, apparatus, configurations and methods of implementation of the present invention without departing from its spirit and scope. Accordingly, the scope of the present invention should not be limited to the particular embodiments illustrated and described herein, as they are merely exemplary in nature, but instead, should be fully commensurate with that of the claims appended hereafter and their functional equivalents.

What is claimed is:

1. A folding retractable covering on a space vehicle for protecting a feature disposed on an exterior surface of the vehicle, wherein the covering comprises:
   a plurality of semicircular ribs, each having opposite ends respectively pinioned at opposite sides of the feature at about the exterior surface of the vehicle for rotational movement about an axis of rotation extending through the opposite ends thereof and through a hemispherical path of revolution extending over the feature; a continuous, flexible cover attached to each of the ribs in such a way that, in a fully deployed position of the covering, in which adjacent ribs are rotated apart from each other at a maximum relative angle therebetween, the cover is stretched generally tangentially between the adjacent ribs to form a generally hemispherical shield over the feature, and in a fully retracted position of the covering, in which adjacent ribs are rotated together at a minimum relative angle therebetween, the flexible covering is collapsed to form a plurality of folded pleats of substantially the same size, each disposed between a respective pair of adjacent ribs; an annular bezel disposed on the exterior surface of the vehicle and aligned generally concentrically with the feature; and each rib having an external periphery larger than the external periphery of the feature and smaller than the internal periphery of the bezel.

2. The covering of claim 1, wherein the fibs have respective radii that are substantially the same size.

3. The covering of claim 2, wherein the folded pleats extend radially inward toward the axis of rotation of the ribs when the covering is fully retracted.

4. The covering of claim 1, wherein the ribs have respective radii that are staggered in size such that the ribs are nested in radial alignment with each other when rotated at a common angle relative to the surface of the vehicle.

5. The covering of claim 1, wherein the flexible cover comprises two parts, each defining a portion of the generally hemispherical shield formed over the feature when the covering is fully deployed.

6. The covering of claim 5, wherein an outermost rib of one of the two parts is slightly larger than an outermost rib of the other part such that the two portions of the hemispherical shield overlap circumferentially when the covering is fully deployed.

7. The covering of claim 5, wherein the two parts of the cover mate with each other at a vertical plane extending through the feature when the covering is fully deployed.

8. The covering of claim 7, wherein the plurality comprises an even number, and wherein half of the ribs are disposed on one side of the feature, and the other half are disposed on an opposite side thereof.

9. The covering of claim 1, wherein the ribs and the folded pleats reside below an upper periphery of the bezel when the covering is fully retracted.

10. The covering of claim 1, wherein the flexible cover comprises at least one of a thermal protection blanket and a micrometeoroid and orbital debris resistant barrier.

11. A folding retractable covering on a space vehicle for protecting a feature disposed on an exterior surface of the vehicle, wherein the covering comprises:
    a plurality of arcuate ribs, each having opposite ends respectively pinioned at opposite sides of the feature at about the surface of the vehicle for rotational movement of the rib about an axis extending through the opposite ends and through an arcuate path of revolution extending over the feature; a continuous, flexible cover attached to each of the ribs in such a way that, in a fully deployed position of the covering, in which adjacent ribs are rotated apart from each other at a maximum relative angle therebetween, the cover is stretched generally tangentially between the adjacent ribs to form an arcuate shield over the feature, and in a fully retracted position of the covering, in which adjacent ribs are rotated together at a minimum relative angle therebetween, the flexible cover is collapsed to form a plurality of folded pleats of substantially the same size, each disposed between a respective pair of adjacent ribs; a bezel disposed on the exterior surface of the vehicle and aligned generally concentrically with the feature; and each rib having an external periphery larger than the external periphery of the feature and smaller than the internal periphery of the bezel.

12. The covering of claim 11, wherein the ribs are substantially the same size.

13. The covering of claim 11, wherein the ribs are staggered in size such that the ribs are nested in radial alignment with each other when rotated at a common angle relative to the surface of the vehicle.

14. The covering of claim 11, wherein the flexible cover comprises two parts, each defining a portion of the arcuate shield formed over the feature when the covering is fully deployed.

15. The covering of claim 14, wherein the two parts of the flexible cover mate with each other at a vertical plane extending through the feature when the covering is fully deployed.

16. The covering of claim 15, wherein the plurality comprises an even number, and wherein half of the ribs are disposed on one side of the feature, and the other half are disposed on an opposite side thereof.

17. The covering of claim 14, wherein an outermost rib of one of the two parts is slightly larger than an outermost rib of the other part such that the two portions of the arcuate shield overlap circumferentially when the covering is fully deployed.

18. The covering of claim 11, wherein the ribs and the folded pleats reside below an upper periphery of the bezel when the covering is fully retracted.

19. The covering of claim 11, wherein the flexible cover comprises at least one of a thermal protection blanket and a micrometeoroid and orbital debris resistant barrier.

20. The covering of claim 11, wherein the ribs are generally semicircular in shape.

21. A method for protecting a feature disposed on an exterior surface of a space vehicle, the method comprising:
    disposing a protective bezel on the exterior surface of the space vehicle and aligned generally concentrically with the feature;

attaching opposite ends of a plurality of generally arcuate ribs to respective ones of a pair of pivot points respectively disposed on opposite sides of the feature, each rib having an external periphery larger than the external periphery of the feature and smaller than the internal periphery of the bezel;

attaching a flexible cover to each of the ribs; and, pivoting the ribs about the pivot points such that, in a closed position, the ribs stretch the cover into a generally arcuate protective covering over the feature, and in an open position, the ribs fold the cover into a plurality of pleats of substantially the same size, each disposed between a respective pair of adjacent ribs, and the ribs nest in radial alignment with each other at the exterior surface of the space vehicle.

22. The method of claim 21, wherein attaching the ribs to the pivot points comprises:

providing two groups of the ribs, each covered by a portion of the flexible cover; and, attaching the opposite ends of the respective ribs of the two groups to respective ones of two pairs of pivot points respectively disposed on opposite sides of the feature such that, a rib of each group engages a rib of the other group at a plane extending through the feature when the ribs are in the closed position, and the ribs of each group respectively nest in radial alignment with each other at the surface of the vehicle and on opposite sides of the feature when the ribs are in the open position.

23. The covering of claim 1, wherein the folded pleats extend in a circumferential direction when the covering is fully retracted.

24. The method of claim 21, wherein the ribs and the folded pleats reside below an upper periphery of the bezel when the covering is fully retracted.

* * * * *